United States Patent
Venalainen et al.

(10) Patent No.: US 10,283,135 B2
(45) Date of Patent: May 7, 2019

(54) TOUCHSCREEN TAPPING NOISE SUPPRESSION

(71) Applicant: Microsoft Technology Licensing, LLC, Redmond, WA (US)

(72) Inventors: Kevin Juho Venalainen, Seattle, WA (US); Sylvain Angrignon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 78 days.

(21) Appl. No.: 15/389,352

(22) Filed: Dec. 22, 2016

(65) Prior Publication Data

US 2018/0182409 A1 Jun. 28, 2018

(51) Int. Cl.
*H04B 15/00* (2006.01)
*G10L 21/0208* (2013.01)
*G06F 3/0488* (2013.01)
*H04M 1/19* (2006.01)
*H04M 1/60* (2006.01)
*G06F 3/0354* (2013.01)

(52) U.S. Cl.
CPC ...... *G10L 21/0208* (2013.01); *G06F 3/04883* (2013.01); *H04M 1/19* (2013.01); *H04M 1/6008* (2013.01); *G06F 3/03547* (2013.01); *G10L 2021/02085* (2013.01); *H04M 2250/22* (2013.01)

(58) Field of Classification Search
CPC .................. G10L 21/0208; G10L 2021/02085
USPC .............................. 381/94.1, 94.2, 94.3, 94.8
See application file for complete search history.

(56) References Cited

U.S. PATENT DOCUMENTS

| 5,930,372 A * | 7/1999 | Kuriyama | ............. G06F 1/1626 381/71.14 |
| 2001/0028720 A1* | 10/2001 | Hou | ........................ H04R 1/406 381/92 |

(Continued)

FOREIGN PATENT DOCUMENTS

| CN | 105045426 A | 11/2015 |
| WO | 2012061554 A1 | 6/2012 |

OTHER PUBLICATIONS

"Low Latency Audio", http://web.archive.org/web/20160404231155/https://msdn.microsoft.com/en-us/library/windows/hardware/mt298187(v=vs.85).aspx, Published on: Apr. 4, 2016, 19 pages.

(Continued)

*Primary Examiner* — Katherine A Faley
(74) *Attorney, Agent, or Firm* — Workman Nydegger

(57) ABSTRACT

Suppression of tapping noise caused by tapping an acoustically coupled touchscreen. When a tapping event is detected on the touchscreen, a tapping noise suppressor is alerted of the event, and responds by at least temporarily mitigating the tapping noise in the audio stream. The suppression occurs temporarily for at least part of the duration of surge in audio levels that occurs as a result of the tapping event, and in a manner that reduces the psychoacoustic impact on the conversation. Suppression may be performed by first placing the tapping noise suppressors in an alert mode when a tapping event occurs. The tapping noise suppressor then monitors the audio stream generated by the microphone for the beginning of the tapping event—which will be represented in the form of a surge in volume. The tapping noise suppressor then temporarily applies the suppression window.

20 Claims, 6 Drawing Sheets

(56) References Cited

U.S. PATENT DOCUMENTS

| | | | | |
|---|---|---|---|---|
| 2004/0044516 | A1* | 3/2004 | Kennewick | G10L 15/22 704/5 |
| 2008/0118082 | A1* | 5/2008 | Seltzer | G10L 21/0208 381/94.1 |
| 2009/0022332 | A1 | 1/2009 | Van schaack et al. | |
| 2010/0109848 | A1* | 5/2010 | Blair | A61G 13/10 340/10.2 |
| 2010/0260353 | A1* | 10/2010 | Ozawa | G10L 21/0208 381/94.3 |
| 2014/0306937 | A1* | 10/2014 | Lim | G06F 3/0416 345/177 |

OTHER PUBLICATIONS

"Audio Signal Processing Modes", http://web.archive.org/web/20160405143715/https:/msdn.microsoft.com/en-us/library/windows/hardware/mt186386(v=vs.85).aspx, Published on: Apr. 5, 2016, 13 pages.

"Audio Driver Development", http://web.archive.org/web/20100423145227/http:/www.intelligraphics.com/audio-driver-development, Published on: Apr. 23, 2010, 3 pages.

"Audio Codec with Integrated Headphone, Speaker Amplifier and Touch Screen Controller", http://www.ti.com/lit/ds/symlink/tsc2101.pdf, Published on: Jun. 2003, 94 pages.

Chen, et al., "A Threshold-based Pattern Recognition to Filter Noise on an Embedded On-cell Touch Panel", In Proceedings of the 19th International Conference on Image Processing, Computer Vision, & Pattern Recognition, Jun. 27, 2015, pp. 256-257.

"N-Trig touchscreen Driver", http://web.archive.org/web/20121130115038/http:/kernel.org/doc/Documentation/input/ntrig.txt, Published on: Nov. 30, 2012, 2 pages.

"Windows Hardware Certification Requirements", http://msdn.microsoft.com/en-us-library/dn423132(v=vs.85).aspx, Published on: May 9, 2012, pp. 1-907.

Fang, Wendy, "Reducing Analog Input Noise in Touch Screen Systems," http://www.ti.com/lit/an/sbaa155a/sbaa155a.pdf, Published on: Jul. 2007, 1-12 pages.

* cited by examiner

TOUCHSCREEN TAPPING NOISE SUPPRESSION

BACKGROUND

Computing systems and associated networks have greatly revolutionized our world. Computing systems are now available in a wide variety of forms and include a wide variety of input options. Such form factors including mobile devices that can be easily carried, and that include significant processing and storage capability. For instance, smart phones include the functionality of a phone, but also are themselves computing systems that can run many other applications.

In any case, whether the computing system is a small device or is large, many computing systems now incorporate touchscreens. Touchscreens not only display content to a user, but also allow a user to provide input by physically interacting with the touchscreen. One type of interaction involves tapping the screen briefly. Such interaction is commonly used to select a displayed object. A user might tap the screen with a finger, fingernail, pen, stylus, and so forth.

Such tapping can transmit acoustic waves through the device itself and/or through the ambient environment to a microphone that is integrated on the same device as the touchscreen. The tapping gesture can thus result in tapping noise (i.e., acoustic signals caused by the tapping) entering into an audio stream generated by the microphone. Such tapping noise can perhaps even be louder than normal conversation, and can be heard by a listener of the audio stream. For instance, participants in a telephone conversation or conference can often hear the tapping noise in the audio stream.

There are a number of conventional mechanical solutions to reduce this tapping noise. These solutions dampen the tapping noise by increasing the acoustic isolation of the microphone and the touchscreen. For instance, the microphone may be supported within the device via a rubber gasket, or may be suspended within the device using strings or wires. Alternatively, the microphone may be simply placed further from the touchscreen. These mechanical solutions have been shown to result in significant attenuation of the acoustic signals as transmitted through the device itself.

There does exist some software solutions that are aimed at noise suppression in general. Such software solution attenuate many types of background noise, but are not aimed specifically at reducing tapping noise. Thus, though there is some suppression of tapping noise, the tapping noise definitively still exists in significant volumes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the suppression of tapping noise caused by tapping a touchscreen. Such a tapping gesture is typically used to, for instance, select a displayed object. Such a tapping gesture can cause acoustic vibrations in the air and in the device itself, so that a tapping noise is present in an audio stream that is generated by nearby microphones. Such might especially be the case if the microphone and touchscreen are located on the same device, such as a mobile phone, laptop or tablet personal computer. If there are multiple microphones acoustically coupled to the device that has the touchscreen, the suppression may be applied to the audio stream generated by each microphone acoustically coupled to the device. For instance, some devices have multiple microphones, and each would clearly be acoustically coupled to the touchscreen also present on that device.

In accordance with the principles described herein, when a tapping event is detected on the touchscreen (e.g., by a pen, stylus, finger, or fingernail) a tapping noise suppressor is alerted of the event, and responds by at least temporarily mitigating the tapping noise. The detection of the tapping event, the alerting of the tapping noise suppressor and/or the suppression of the tapping noise from the audio stream generated by the microphone may each be accomplished using software and/or hardware.

The suppression occurs temporarily for at least part of the duration of the surge in audio levels that occurs as a result of the tapping event. Furthermore, the suppression is performed so as to minimize the psychoacoustic impact of the tapping event on the audio stream (e.g., a conversation). For instance, the suppression of the tapping noise occurs in a manner that there is lesser or no perceived suppression of desirable sound, such as conversation, and lesser or no perceived artifacts in the audio created from the suppression.

In one embodiment, this is performed by first placing the tapping noise suppressor in an alert mode when a tapping event occurs. The tapping noise suppressor then monitors the audio stream generated by the microphone for the beginning of the tapping noise which will be represented in the form of a surge in volume. The tapping noise suppressor then applies a suppression window, which may be a time-wise (or temporal) suppression window or a frequency-based suppression window.

In the case of a temporal suppression window, the window may have a higher suppression when the window is first applied to diminish the impact of the maximum volume of the tapping noise. However, even that higher suppression may be limited in duration to far less than the entire duration of the tapping noise and may be designed to mitigate the tapping noise at its highest noise level. Later in the tapping window, which captures the trailing edge of the tapping noise, the suppression may trail off until the suppression of the audio signal returns to zero suppression. After the end of the suppression window, the tapping noise suppressor may then exit alert mode, and await the next alert.

This type of temporal window has been found to have less psychoacoustic impact than by simply applying a fixed suppression amount for the entire duration of the tapping sound. However, a frequency window may also be at least temporarily applied for at least a portion of the duration of the tapping noise for similar effect. There may also be different temporal or frequency suppression windows that are applied for different tapping events (e.g., a hard tap versus a soft tap, or a tap by a finger, fingernail, pen or stylus of one type, pen or stylus of another type, and so forth).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
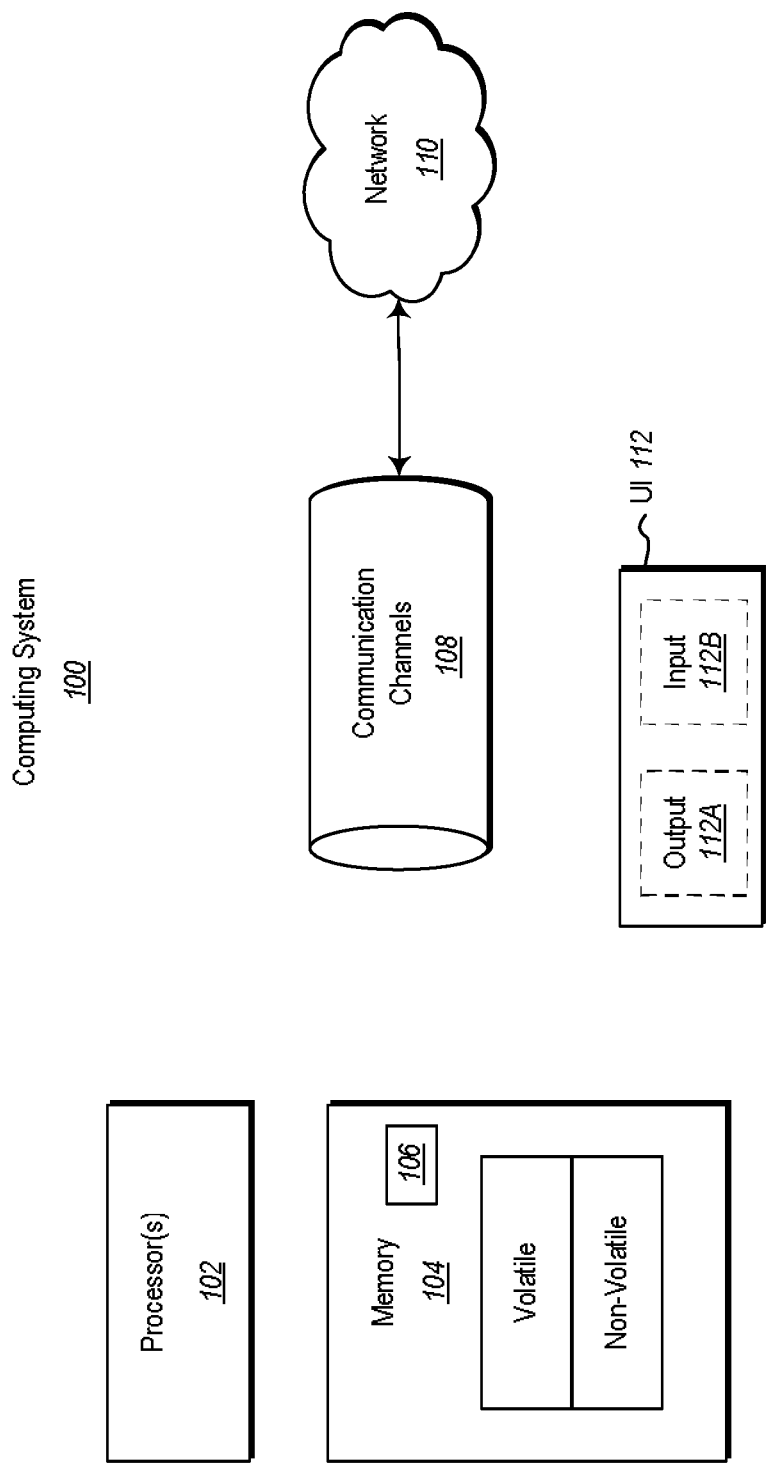
FIG. 1 illustrates an example computer system in which the principles described herein may be employed.

At least some embodiments described herein relate to the suppression of tapping noise caused by tapping a touchscreen. Such a tapping gesture is typically used to, for instance, select a displayed object. Such a tapping gesture can cause acoustic vibrations in the air and in the device itself, so that a tapping noise is present in an audio stream that is generated by nearby microphones. Such might especially be the case if the microphone and touchscreen are located on the same device, such as a mobile phone, laptop or tablet personal computer. If there are multiple microphones acoustically coupled to the device that has the touchscreen, the suppression may be applied to the audio stream generated by each microphone acoustically coupled to the device. For instance, some devices have multiple microphones, and each would clearly be acoustically coupled to the touchscreen also present on that device.

In accordance with the principles described herein, when a tapping event is detected on the touchscreen (e.g., by a pen, stylus, finger, or fingernail) a tapping noise suppressor is alerted of the event, and responds by at least temporarily mitigating the tapping noise. The detection of the tapping event, the alerting of the tapping noise suppressor and/or the suppression of the tapping noise from the audio stream generated by the microphone may each be accomplished using software and/or hardware.

The suppression occurs temporarily for at least part of the duration of the surge in audio levels that occurs as a result of the tapping event. Furthermore, the suppression is performed so as to minimize the psychoacoustic impact of the tapping event on the audio stream (e.g., a conversation). For instance, the suppression of the tapping noise occurs in a manner that there is lesser or no perceived suppression of desirable sound, such as conversation, and lesser or no perceived artifacts in the audio created from the suppression.

In one embodiment, this is performed by first placing the tapping noise suppressor in an alert mode when a tapping event occurs. The tapping noise suppressor then monitors the audio stream generated by the microphone for the beginning of the tapping noise which will be represented in the form of a surge in volume. The tapping noise suppressor then applies a suppression window, which may be a time-wise (or temporal) suppression window or a frequency-based suppression window.

In the case of a temporal suppression window, the window may have a higher suppression when the window is first applied to diminish the impact of the maximum volume of the tapping noise. However, even that higher suppression may be limited in duration to far less than the entire duration of the tapping noise and may be designed to mitigate the tapping noise at its highest noise level. Later in the tapping window, which captures the trailing edge of the tapping noise, the suppression may trail off until the suppression of the audio signal returns to zero suppression. After the end of the suppression window, the tapping noise suppressor may then exit alert mode, and await the next alert.

This type of temporal window has been found to have less psychoacoustic impact than by simply applying a fixed suppression amount for the entire duration of the tapping sound. However, a frequency window may also be at least temporarily applied for at least a portion of the duration of the tapping noise for similar effect. There may also be different temporal or frequency suppression windows that are applied for different tapping events (e.g., a hard tap versus a soft tap, or a tap by a finger, fingernail, pen or stylus of one type, pen or stylus of another type, and so forth).

Because the principles described herein operate in the context of a computing system, a computing system will be described with respect to FIG. 1. Then, the principles of the tapping noise suppression will be described with respect to FIGS. 2 through 7.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The principles described herein relate to a mechanism for suppressing tapping noise in an audio stream, particularly when there is a tight acoustic coupling between the touchscreen that is being tapped on, and the microphone that is picking up the resulting tapping noise. Unless that tapping noise is attenuated, the tapping noise may appear in the audio stream along with all of the other desired sound when transmitted to a remote user.

Removing tapping noise in a real-time interactive communication environment can be particularly problematic as the tapping noise needs to be removed quickly. To give a sense of scale, it can take from one millisecond or less to only ten milliseconds for a tapping on the touchscreen to result in a corresponding tapping noise in the audio stream. Thus, unless that tapping noise is attenuated quickly, the tapping noise may appear in the audio stream that is transmitted to other users.

A user's tapping on a screen can have a negative psychoacoustic impact on a listener. This can be particularly true where the user taps with a hard object such as a pen, stylus or fingernail, and/or when the user taps with high impulse pressure on the touchscreen. Accordingly, even tapping with the soft flesh of a finger may result in some tapping noise.

The tapping noise can be distracting from the audio of interest, and can result in a level of annoyance for the listener of the audio stream. Participants in the audio conversation or conference can reduce this annoyance by simply refraining from tapping on the touchscreen during the conference, but that reduces the functionality of the touchscreens that the users are interfacing with. It may well be that the participant is using a touchscreen to emphasize important concepts relevant to the conference, or perhaps needs to address another urgent matter. Frankly, the user may even be bored with the audio conference and be seeking relief in the form of a temporary distraction. Others find that such distractions are not distractions at all, but actually find that they operate more efficiently and are capable of focusing on a particular task when performing tasks in parallel. In any case, the principles described herein allow the user to continue to tap on their touchscreen while having the tapping noise itself suppressed from the audio stream generated by microphones that pick up that tapping noise. Thus, the user may continue to tap on their touchscreen, with reduced or eliminated psychoacoustic impact on listeners.

Figure 2:
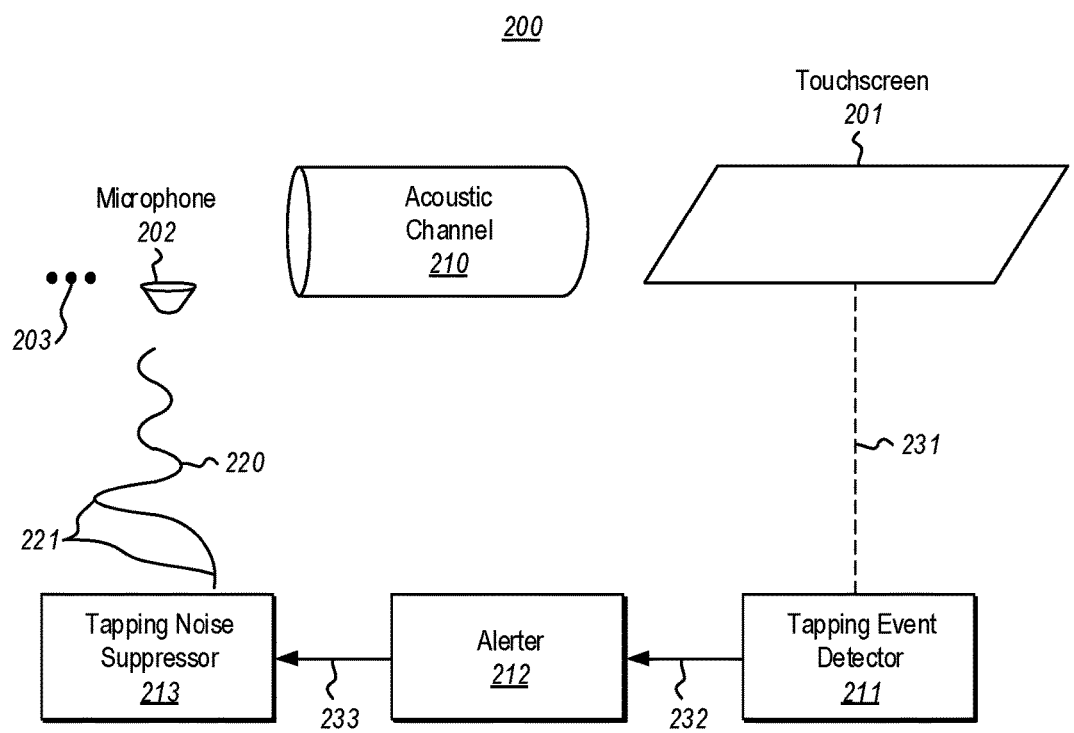
FIG. 2 illustrates a system in accordance with the principles described herein, which represents an example of the computing system of FIG. 1, and which includes a touchscreen that is acoustically coupled to a microphone that generates an audio stream such that tapping on the touchscreen results in tapping noise in the audio stream, and which also includes a mechanism for suppressing tapping noise from the audio stream.
Figure 3:
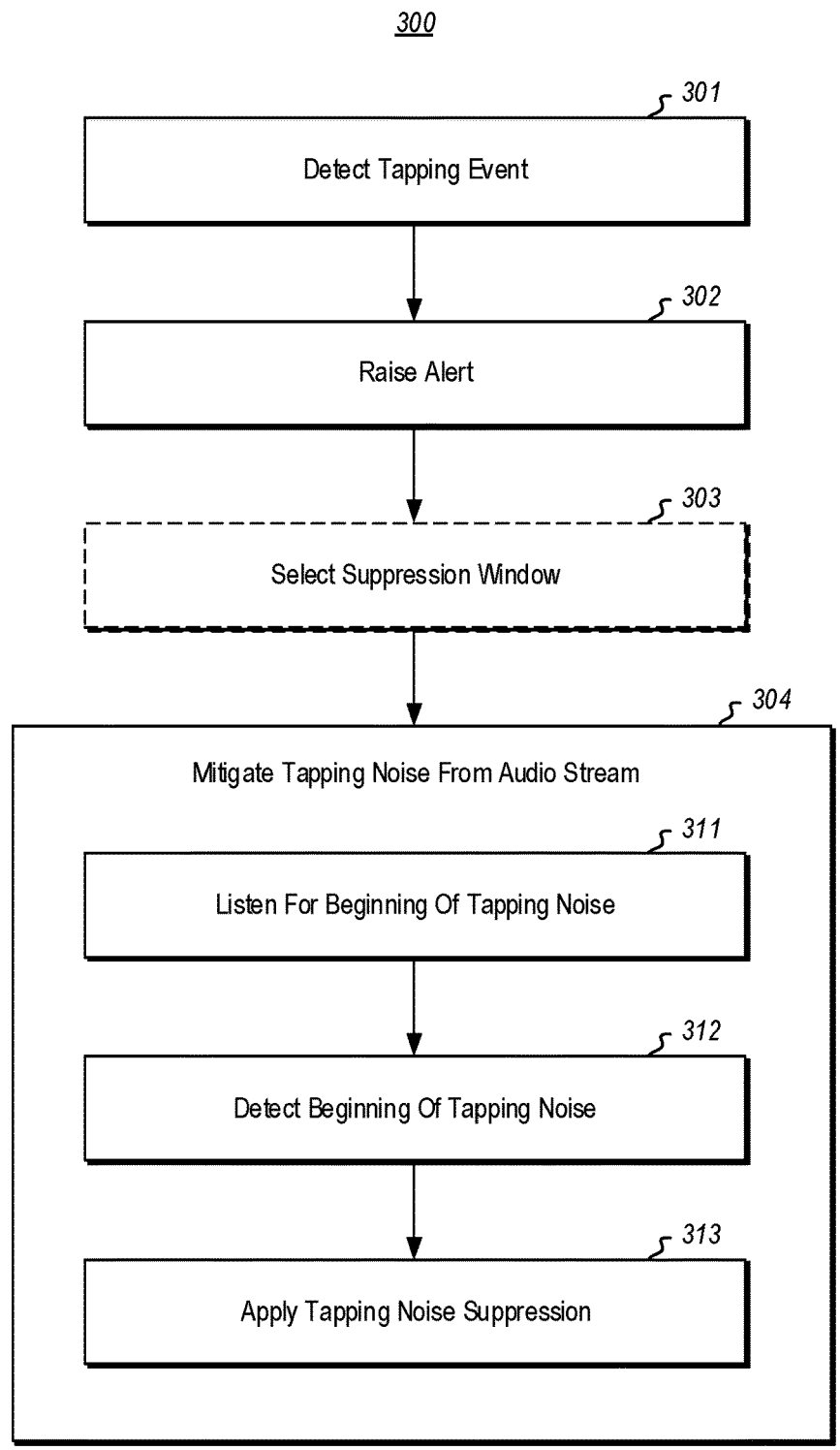
FIG. 3 illustrates a flowchart of a method for suppressing tapping noise in accordance with the principles described herein.

FIG. 2 illustrates a system 200 in accordance with the principles described herein. The system 200 may represent an example of the computing system 100 of FIG. 1. The system 200 includes input devices in the form of a touchscreen 201 and a microphone 202. Accordingly, the touchscreen 201 and microphone 202 represents an example of the input mechanisms 112B of FIG. 1. The touchscreen 201 may of course also render displayed content and thus serve also as an output device. The touchscreen 202 thus also represents an example of the output mechanism 112A of FIG. 1.

The microphone 202 is acoustically coupled to the touchscreen 201. This acoustical coupling means that vibrations caused by user interaction with the touchscreen 201 (and in particular tapping of that touchscreen) are conveyed to the microphone 202 so as to be caught within the audio stream 220 generated by the microphone. This very real acoustic channel is symbolically represented in FIG. 2 by the channel 210. However, the acoustic channel 210 may have multiple components including acoustics transmitted through the air as a medium, and/or acoustic vibrations transmitted mechanically via the materials of the system 200 itself (e.g., via the materials of the device). That former is dominant in cases in which the touchscreen 201 and microphone 202 are not integral in a single device. However, both types of transmission can occur when the touchscreen 201 and microphone 202 are integrated within the same device, as is often the case with smart phones, laptops, tablet computers, and so forth.

For instance, in the context of FIG. 2, the tapping noise may be caused by tapping the touchscreen 201 and may be present within the audio stream 220 that is generated by the microphone 202. For instance, FIG. 2 illustrates a volume increase at point 221. As previously mentioned, it can take a matter of mere milliseconds for a tapping event on the touchscreen 201 to result in tapping noise entering into the audio stream 220 via the microphone 202.

The ellipses 203 represent that there may be multiple microphones acoustically coupled to the touchscreen 201. For instance, some devices have multiple microphones. The suppression mechanism described herein as being performed with respect to the audio stream generated by microphone 202 may also be performed for each other of such microphones. Accordingly, if there are multiple microphones acoustically coupled to the device that has the touchscreen, the suppression may be applied to the audio stream generated by each microphone acoustically coupled to the device.

The system 200 shows a tapping event detector 211, an alerting component 212 and a tapping noise suppressor 213, which may each be software, hardware and/or a combination. Each of the components 211, 212, and 213 are examples of the executable component 106 described hereinabove. Furthermore, each of these components will be described below with respect to FIG. 3, which illustrates a flowchart of a method 300 for suppressing tapping noise.

The method 300 may be initiated each time a tapping event is detected on the touchscreen 201. Accordingly, for a sequence of tapping events that occur over time, the method 300 may be performed multiple times.

The method 300 is initiated upon detection of a tapping event (act 301). For instance, the tapping event occurs when a user taps on the touchscreen. The resulting tapping event is detected by the tapping event detector 211. The capability of the tapping event detector 211 to detect such events is symbolically represented in FIG. 2 by the dashed line 231. In one embodiment, the tapping event detector 211 is a software component that is built into the operating system. In another embodiment, the tapping event detector 211 is in the driver stack of the digitizer for events related to input at the touchscreen 201. In yet other embodiments, the tapping event detector 211 is actually a hardware circuit that receives and evaluates input events of the touchscreen 202. The hardware implementation is faster, but results in a more complex hardware implementation.

Upon detecting the tapping event (act 301), the tapping noise suppressor is alerted to the tapping event (act 302). This alerting may occur via the alerting component 212 of FIG. 2. As an example, in a software implementation, when any touchscreen event occurs, that touchscreen event may be published to an event clearinghouse (e.g., the alerting component 212). The tapping noise suppressor may subscribe to tapping event types from the alerting component 212. Thus, the alerting component may take the form of a publication/subscription object. In a hardware implementation, the alerting component 212 may be as simple as a wire having a signal of a binary state carried thereon, with one binary state representing the detection of a touch event, and another binary state representing the absence of a touch event. The hardware implementation might alternatively be a processor register or a fixed portion of memory that is monitored for a change in state that is representative of a tapping event being detected. In FIG. 2, the process of alerting is represented by arrows 232 and 233.

The tapping noise suppressor 213 responds to the alert by at least temporarily mitigating the tapping noise from the audio stream (act 304). If there is more than one possible suppression window, then the tapping noise suppressor 213 may also select the appropriate suppression window (act 303). As an example, the suppression window may be a default suppression window, or may be based on the tapping event type, or one or more features of the tapping event.

In some embodiments, the alerting of the tapping noise suppressor occurs before the tapping noise has even been received by the microphone. In other case, some very small amount of delay is introduced into the audio stream (e.g., 10 milliseconds) so that the tapping noise suppressor is at least alerted prior to the tapping noise being observed in the delayed form of the audio stream.

Thus, the mitigation of the tapping noise may occur by the tapping noise suppressor first listening for a beginning of the tapping noise in the audio stream (act 311) (e.g., the live audio stream generated by the microphone 202 or a slightly delayed version thereof). Once the beginning of the tapping noise is detected in the audio stream (act 312), the tapping noise suppressor applies tapping noise suppression to the tapping noise (act 313).

In a software implementation, the tapping noise suppressor may be, for instance, an audio processing object (APO) or any other component that has access to the audio stream. The tapping noise suppressor may also be a hardware component. In a completely hardware implementation of all of the tapping event detector 211, the alerting component 212, and the tapping noise suppressor 213, the tapping noise suppressor 213 may be ready to suppress the tapping noise within microseconds of the tapping event. In a software implementation, the tapping noise suppressor 212 may be ready within a matter of milliseconds. Thus, the audio stream may be delayed slightly in a completely software implementation.

Figure 4:
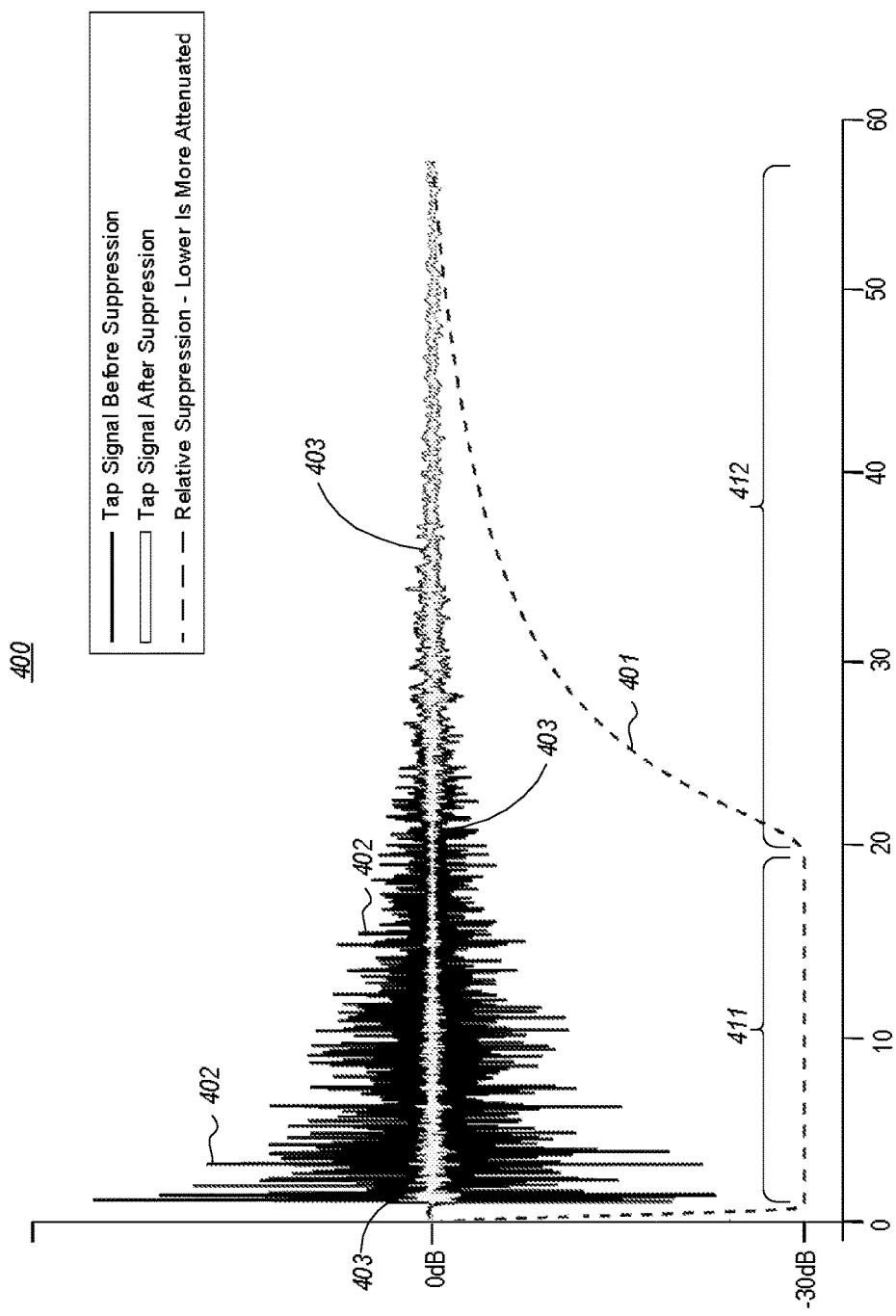
FIG. 4 represents a chart that shows a temporal suppression window in conjunction with an example suppressed and unsuppressed audio stream with time since the beginning of the detected tapping noise in the audio stream being measured on the horizontal axis, and with the amount of suppression (measured in decibels) on the vertical axis.
Figure 5:
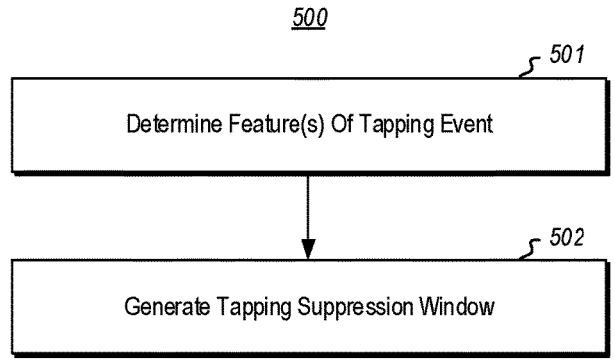
FIG. 5 illustrates a method for calculating a temporal and/or frequency suppression window for suppression of tapping noise in accordance with the principles described herein.

The mitigation of the tapping noise might occur by applying a temporal suppression window having a particular temporal profile. For instance, FIG. 4 illustrates a chart 400 that shows a temporal suppression window using dashed line 401. For comparison, an unsuppressed audio stream signal is represented with the darker region 402. The suppressed audio stream signal is represented with the lighter region 403 that is vertically centered within the darker region 402. Time is represented on the horizontal axis with certain points labelled in units of milliseconds. The vertical axis represents, for dashed line 401, the amount of suppression in decibels. The amplitude of the darker region 402 and the lighter region 403 represent the relative amplitude of the unsuppressed and suppressed signals, respectively, over time.

The temporal suppression window 401 represents the result of empirical studies where the item used to tap is a pen, and the device is an all-in-one device that includes both the touchscreen and the microphone. The empirical studies were aimed at designing a temporal suppression window that maximizes positive psychoacoustic impact of suppression on listeners. That is, the temporal suppression window 401 was designed to reduce the annoyance of the tapping noise to the listener, while at the same time avoiding degradation in the actual audio of interest.

As can be seen, the window 400 includes a particular point of highest suppression (region 411) that at least covers the point of highest tapping noise. Notice at this point, the suppression of the audio is not complete muting of the audio signal, and is only minus 30 decibels. Furthermore, the maximum suppression represents only a small portion (perhaps 20 milliseconds) of the entire suppression window, which covers approximately 50 to 100 milliseconds. The window 400 also includes a trailing suppression region 412 that occurs for at least a majority of the temporal suppression window 400. The trailing suppression region is illustrated as including a logarithmically (even on this logarithmic scale) decaying suppression.

Although the suppression window in FIG. 4 is illustrated as being a temporal (time-wise) suppression window, the suppression window might also be best expressed as a frequency-based suppression window. A frequency-based suppression window may be expressed in the form of a frequency profile which defines an amount of suppression for each frequency within a set of frequencies (such as a frequency range).

Furthermore, the suppression window (temporal or frequency) may differ (as determined by act 303) depending on a type of tapping event. For instance, the tapping event may be characterized by the type and/or model of tapping object (pen, stylus, fingernail, finger, or so forth). Alternatively or in addition, if the tapping object is a product (such as a pen or stylus), the tapping event may be characterized by the model of the tapping object. The tapping type might also be characterized by a tapping duration, tapping frequency, tapping pressure and so forth. Alternatively, or in addition, the tapping suppression may also depend on the size, model, material, or design of the touchscreen, as that could have an impact on the actual acoustics that are generated by the tapping event. The suppression window may also be identified or calculated in real-time in accordance with the method 500 of FIG. 5. For instance, based on at least one determined feature of the tapping event (act 501), the suppression window may be generated (act 502).

Figure 6:
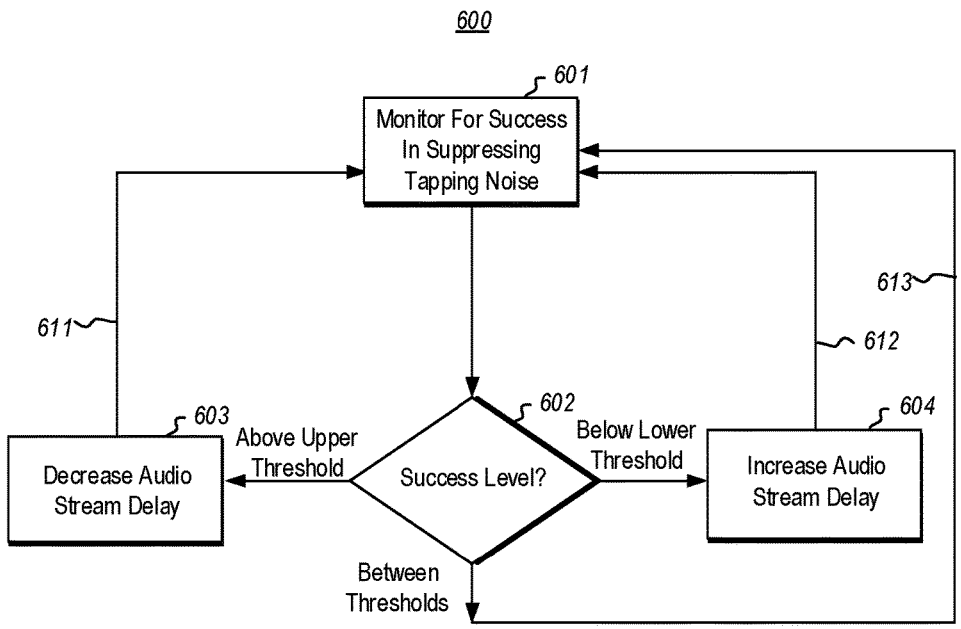
FIG. 6 illustrates a flowchart of a method for adapting the amount of delay in the audio stream based on success levels in tapping noise suppression.

As mentioned below, there may be some delay introduced into the audio stream to allow the tapping noise suppressor to begin monitoring for the tapping noise in the audio stream before the tapping noise actually appears in the audio stream. In one embodiment, this amount of delay may be adaptive. FIG. 6 illustrates a flowchart of a method 600 of adapting the amount of delay in the audio stream. The method 600 may be continuously performed, or performed in accordance with a rolling performance window.

The system monitors for success in suppressing tapping noise (act 601). If tapping noise suppression is successful above a certain upper threshold ("Above Upper Threshold" in decision block 602), then the amount of delay introduced into the audio stream may be reduced (act 603), and the method continues monitoring for success (as represented by arrow 611). On the other hand, if the tapping noise suppression is not successful to above a certain lower threshold ("Below Lower Threshold" in decision block 602), then the amount of delay introduced into the audio stream may be increased (act 604), and the method continues monitoring for success (as represented by arrow 612). If the success level is between the upper and lower thresholds ("Between Thresholds" in decision block 602), then the amount of delay is not adjusted, but rather the method continues monitoring for success (as represented by arrow 613).

Success may be measured as a function of one or more parameters. The parameters might include, for instance, the percentage time that the suppression window overlaps the entirety of tapping events in the audio stream as measured over multiple tapping events. The parameters might also include, for instance, the average duration of non-overlap when the suppression window does not overlap with the tapping event within the audio stream as measured over multiple tapping events. The parameters might also include, a maximum amplitude of the audio during the period of the tapping event in the audio stream as measured over multiple tapping events. The upper threshold and lower thresholds are selected by balancing competing interests in suppressing tapping noise while keeping audio delay at reasonable levels. The distance between the upper and lower thresholds may be kept so as to introduce hysteresis to thereby avoid adjusting the delay frequently, which can cause jitter to be noticed within the audio and can itself have adverse psychoacoustic impact on the listener.

Alternatively or in addition, the system may adjust the number of touchscreen events (tapping or otherwise) that are accumulated prior to evaluation by the event detector 211 in response to monitored success in suppressing tapping noise. For instance, for efficient handling of touchscreen events, a number of touchscreen events may be accumulated prior to releasing the entire event stream for processing by components that are to process the events, such as the tapping event detector 211.

Figure 7:
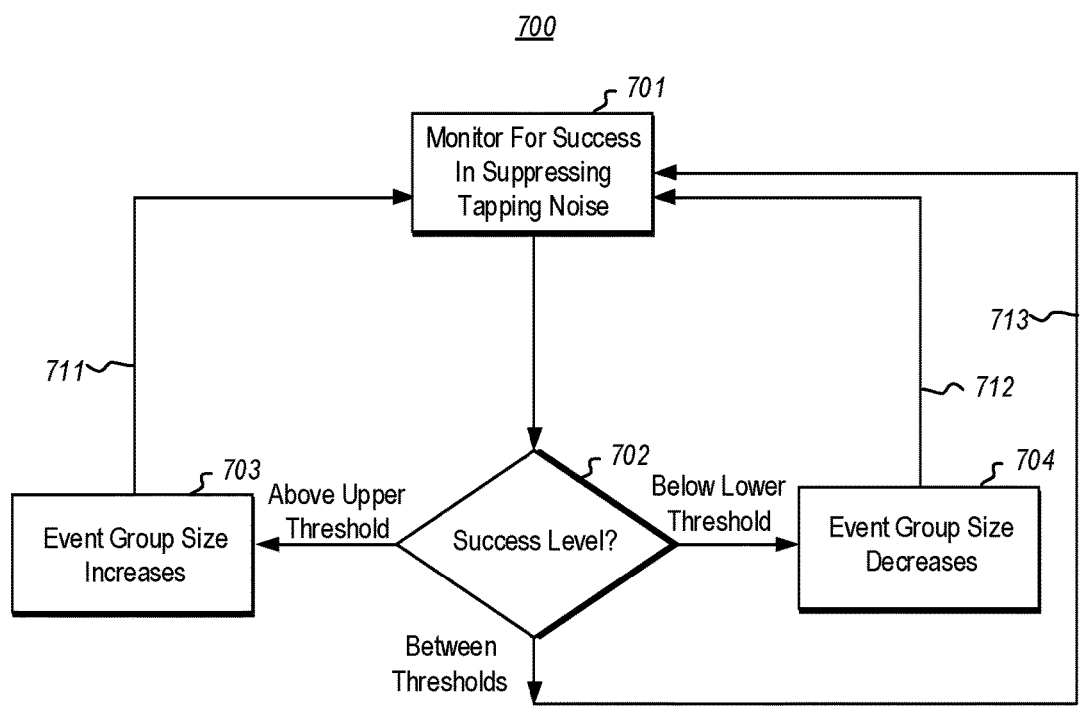
FIG. 7 illustrates a flowchart of a method for adapting a size of a group of accumulate events based on success levels in tapping noise suppression.

FIG. 7 illustrates a flowchart of a method 700 of adapting the size (in time of accumulation of number of events) of accumulated groups of touchscreen events prior to releasing for processing. The method 700 may be continuously performed, or performed in accordance with a rolling performance window. The system monitors for success in suppressing tapping noise (act 701). If tapping noise suppression is successful above a certain upper threshold ("Above Upper Threshold" in decision block 702), then the size of the group of events is allowed to increase (act 703), and the method continues monitoring for success (as represented by arrow 711). On the other hand, if the tapping noise suppression is not successful to above a certain lower threshold ("Below Lower Threshold" in decision block 702), then the size of the group of events is allowed to decrease (act 704), and the method continues monitoring for success (as represented by arrow 712). If the success level is between the upper and lower thresholds ("Between Thresholds" in decision block 702), then the size of the group of events is not adjusted, but rather the method continues monitoring for success (as represented by arrow 713). Again, the measures of success, and the considerations in the choice of the upper and lower thresholds are similar to those measures and considerations described with respect to FIG. 6.

Although the method 300 may be performed entirely on the transmit side, the method 300 may also be performed on the receive side. In that case, the receive side may not have access to a touchscreen event stream. Instead, the audio stream may be monitored for signature audio characteristics of a tapping noise. In this manner, the detection of touch events (act 301) occurs by direct analysis of the incoming audio. Then a slight delay might be introduced into the audio stream to allow a tapping noise suppressor time to be properly alerted and begin to monitor for the tapping signature in the delayed audio stream. This embodiment is helpful in the case that the individual doing the tapping has a device that is not capable of performing tap suppression. In that case, at least the individual that is listening is spared from the full brunt of tapping noise in the audio stream.

Accordingly, the principles described herein provide an effective mechanism for performance of tapping noise suppression in the audio stream provided by a microphone that is acoustically coupled to a touchscreen. The user may thus freely tap away at their touchscreen even though their microphone is on and generating an audio stream, without worry that the listeners are going to be bothered by the tapping noise. Furthermore, the psychoacoustics of the listeners is greatly improved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system including one or more processors, for suppressing tapping noise associated with an audio stream, the method comprising:
   detecting a tapping event on a touchscreen, the tapping event causing a tapping noise; and
   in response to detecting the tapping event,
      applying a delay to the audio stream, such that a delayed version of the audio stream is created;
      detecting an event type of the tapping event;
      determining a suppression window in which to mitigate the tapping noise within the delayed version of the audio stream, the suppression window having a particular profile based on the event type of the tapping event that includes a flat and increased audio suppression level at least during a duration of highest tapping noise, and having trailing suppression for at least a majority of the suppression window that occurs after the duration of highest tapping noise;
      detecting a beginning of the tapping noise within the delayed version of the audio stream; and
      mitigating the tapping noise in the delayed version of the audio stream during the determined suppression window using the particular profile for the detected event type of the tapping event, the suppression window beginning upon detection of the beginning of the tapping noise.

2. The method in accordance with claim 1, the mitigation of the tapping noise occurring by a tapping noise suppressor first listening for a beginning of the tapping noise in the audio stream and then applying tapping noise suppression to the tapping noise after the beginning of the tapping noise in the audio stream.

3. The method in accordance with claim 1, the suppression window comprising a temporal suppression window and the particular profile being a particular temporal profile.

4. The method in accordance with claim 3, further comprising the following for the tapping event:
   determining at least one feature of the tapping event; and
   formulating the temporal suppression window based on one or more of the at least one of the determined features of the tapping event.

5. The method in accordance with claim 1, the suppression window comprising a frequency-based suppression window having a particular frequency profile.

6. The method in accordance with claim 5, further comprising the following for the tapping event:
   determining at least one feature of the tapping event; and
   formulating the frequency profile based on one or more of the at least one of the determined features of the tapping event.

7. The method in accordance with claim 1, further comprising:
   in response to applying the delay to the audio stream, performing at least the following:
      monitoring for success in suppressing the tapping noise;
      determining a success rate associated with suppressing tapping noise based on the monitoring; and
      adjusting the delay to the audio stream in response to the determined success rate associated with suppressing tapping noise.

8. The method in accordance with claim 1, further comprising determining a particular size of groups of events to be processed prior to processing any detected tapping events.

9. The method in accordance with claim 8, further comprising:
   monitoring for success in suppressing tapping noise;
   determining a success rate associated with suppressing tapping noise based on the monitoring; and
   adjusting the size of groups of events in response to the determined success rate associated with suppressing tapping noise.

10. The method in accordance with claim 1, the detection of the tapping event occurring on a same device as the touchscreen by monitoring touchscreen events.

11. The method in accordance with claim 1, the detection of the tapping event occurring by monitoring one or more features of the audio stream for features indicative of a touchscreen event.

12. The method in accordance with claim 1, the detection of the tapping event occurring by monitoring an event stream provided by an operating system or touchscreen driver stack.

13. The method in accordance with claim 1, the event type of the tapping event being a tapping object event type by a particular detected type of tapping object, the particular profile of the suppression window being configured with the flat and increased audio suppression level at least during the duration of highest tapping noise caused by the particular detected type of tapping object, and configured with the trailing suppression for at least a majority of the suppression window that occurs after the duration of highest tapping noise for the particular detected type of tapping object.

14. The method in accordance with claim 1, the event type of the tapping event being a tapping pressure event type with a particular detected tapping pressure, the particular profile of the suppression window being configured with the flat and increased audio suppression level at least during the duration of highest tapping noise caused by the particular detected tapping pressure, and configured with the trailing suppression for at least a majority of the suppression window that occurs after the duration of highest tapping noise for the particular detected tapping pressure.

15. The method in accordance with claim 1, the event type of the tapping event being a tapping duration event type with a particular detected tapping duration, the particular profile of the suppression window being configured with the flat and increased audio suppression level at least during the duration of highest tapping noise caused by the particular detected tapping duration, and configured with the trailing suppression for at least a majority of the suppression window that occurs after the duration of highest tapping noise for the particular detected tapping duration.

16. A computing system, comprising:
   one or more processors; and
   one or more hardware storage devices having stored thereon computer-executable instructions that are executable by the one or more processors to cause the computing system to suppress tapping noise associated with an audio stream, the computer-executable instructions including instructions that are executable to cause the computing system to perform at least the following:
detect a tapping event on a touchscreen, the tapping event causing a tapping noise; and
in response to detecting the tapping event,
apply a delay to the audio stream, such that a delayed version of the audio stream is created;
detect an event type of the tapping event;
determine a suppression window in which to mitigate the tapping noise within the delayed version of the audio stream, the suppression window having a particular profile based on the event type of the tapping event that includes a flat and increased audio suppression level at least during a duration of highest tapping noise, and having trailing suppression for at least a majority of the suppression window that occurs after the duration of highest tapping noise;
detect a beginning of the tapping noise within the delayed version of the audio stream; and
mitigate the tapping noise in the delayed version of the audio stream during the determined suppression window using the particular profile for the detected event type of the tapping event, the suppression window beginning upon detection of the beginning of the tapping noise.

17. The computing system in accordance with claim 16, the suppression window comprising a temporal suppression window and the particular profile being a particular temporal profile.

18. The computing system in accordance with claim 17, the computer-executable instructions further including instructions that are executable to cause the computing system to perform the following for the tapping event:
determine at least one feature of the tapping event; and
formulate the temporal suppression window based on one or more of the at least one of the determined features of the tapping event.

19. The computing system in accordance with claim 16, the suppression window comprising a frequency-based suppression window having a particular frequency profile.

20. A computer program product comprising one or more hardware storage devices having stored thereon computer-executable instructions that are executable by one or more processors of a computing system to cause the computing system to suppress tapping noise associated with an audio stream, the computer-executable instructions including instructions that are executable to cause the computing system to perform at least the following:
detect a tapping event on a touchscreen, the tapping event causing a tapping noise; and
in response to detecting the plurality of tapping events,
apply a delay to the audio stream, such that a delayed version of the audio stream is created;
detect an event type of the tapping event;
determine a suppression window in which to mitigate the tapping noise within the delayed version of the audio stream, the suppression window having a particular profile based on the event type of the tapping event that includes a flat and increased audio suppression level at least during a duration of highest tapping noise, and having trailing suppression for at least a majority of the suppression window that occurs after the duration of highest tapping noise;
detect a beginning of the tapping noise within the delayed version of the audio stream; and
mitigate the tapping noise in the delayed version of the audio stream during the determined suppression window using the particular profile for the detected event type of the tapping event, the suppression window beginning upon detection of the beginning of the tapping noise.

* * * * *